United States Patent
Nabeto et al.

(10) Patent No.: US 10,488,881 B1
(45) Date of Patent: Nov. 26, 2019

(54) POWER SUPPLY CIRCUIT

(71) Applicant: OMRON Corporation, Kyoto-shi, Kyoto (JP)

(72) Inventors: Misato Nabeto, Kyoto (JP); Keiki Matsuura, Kyoto (JP); Yui Kimura, Kyoto (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 16/331,186

(22) PCT Filed: Sep. 25, 2017

(86) PCT No.: PCT/JP2017/034428
§ 371 (c)(1),
(2) Date: Mar. 7, 2019

(87) PCT Pub. No.: WO2018/074144
PCT Pub. Date: Apr. 26, 2018

(30) Foreign Application Priority Data

Oct. 18, 2016 (JP) .................. 2016-204683

(51) Int. Cl.
*H02M 3/158* (2006.01)
*G05F 1/67* (2006.01)
(Continued)

(52) U.S. Cl.
CPC .................. *G05F 1/67* (2013.01); *H02J 7/35* (2013.01); *H02M 3/158* (2013.01); *H02M 7/12* (2013.01)

(58) Field of Classification Search
CPC .... H02M 3/156; H02M 3/158; H02M 3/1582; H02M 7/12; H02M 7/155; H02J 7/35; G05F 1/66; G05F 1/67
See application file for complete search history.

(56) References Cited

U.S. PATENT DOCUMENTS 7,795,761 B2 *  9/2010  Huynh ............... H02M 3/07
                                                 307/140
2017/0163157 A1 *  6/2017  Petersen ............. H02M 1/14
(Continued)

FOREIGN PATENT DOCUMENTS

JP  2012-135164 A  7/2012
JP  2014-007818 A  1/2014
JP  2014-33494 A  2/2014

OTHER PUBLICATIONS

Stefano Stanzione, et al., "A 500 nW Batteryless Integrated Electrostatic Energy Harvester Interface Based on a DC-DC Converter with 60V Maximum Input Voltage and Operating From 1μW Available Power, Including MPPT and Cold Start", ISSCC 2015/ Session 20/Energy Harvesting and SC Power Conversion/20.8, 2015 IEEE International Solid-State Circuits Conference—Digest of Technical Papers, Feb. 25, 2015, Concise explanation of relevance provided in the specification.
(Continued)

*Primary Examiner* — Matthew V Nguyen
(74) *Attorney, Agent, or Firm* — Metrolex IP Law Group, PLLC

(57) ABSTRACT

A power supply circuit includes: a primary capacitor configured to temporarily store the energy from an energy harvester; a storage element configured to store the energy for supply to a load; a buck converter configured to charge the storage element with the energy stored in the primary capacitor; a secondary capacitor configured to connect to the primary capacitor to operate in a first state where the voltage between both terminals of the primary capacitor is applied to both terminals of the secondary capacitor and a second state where the voltage between both terminals of the primary capacitor is not applied to both terminals of the secondary
(Continued)

capacitor; and a control circuit configured to operate with the secondary capacitor as a power source.

19 Claims, 9 Drawing Sheets

(51) Int. Cl.
*H02M 7/12* (2006.01)
*H02J 7/35* (2006.01)

(56) References Cited

U.S. PATENT DOCUMENTS

2018/0041120 A1* 2/2018 Chen ..................... H02M 3/158
2019/0181755 A1* 6/2019 Swamy ............... H02M 3/1582

OTHER PUBLICATIONS

An English translation of the International Search Report of PCT/JP2017/034428 dated Dec. 19, 2017.
The Written Opinion of PCT/JP2017/034428 dated Dec. 19, 2017.

* cited by examiner

POWER SUPPLY CIRCUIT

FIELD

The present invention relates to power supply circuits; more specifically, the present invention relates to a power supply circuit that converts the high-voltage low-current energy generated by an energy harvester into low-voltage power for operating a load (i.e., an electronic circuit).

BACKGROUND

An energy harvester which generates low power, such as an electret-based vibration energy harvester, provides high-voltage power; the power supply circuit is known to convert this high-voltage power into low voltage power for operating a load (i.e., an electronic circuit).

This kind of power supply circuit temporarily stores the energy from the energy harvester in a low-capacity capacitor on the input side, and uses a buck converter to charge a high-capacity capacitor on the output side with the energy stored in the input-side capacitor. However, if the power needed to drive the buck converter is taken from the input-side capacitor, the power supplied from the energy harvester to the power supply circuit is needlessly consumed since it is high-voltage power. Therefore, it is suggested that the energy for driving the buck converter should come from the output-side capacitor.

More specifically, it is proposed to provide a first fixed current circuit, and a second fixed current circuit, wherein the first fixed current circuit generates a fixed current from the voltage of the input-side capacitor, and the second fixed current circuit generates a fixed current from the voltage of the output-side capacitor. If the output-side capacitor provides low voltage, the buck converter is driven using current from the first fixed current circuit, and if the output-side capacitor provides high voltage, the buck converter is driven using current from the second fixed current circuit (see Patent Literature 1). The output-side capacitor and the input-side capacitor are charged simultaneously until the voltage in the input-side capacitor reaches a predetermined voltage. When the voltage in the input-side capacitor reaches the predetermined voltage, the output-side capacitor is disconnected from the input-side capacitor and the buck converter is driven using the voltage from the output-side capacitor (see Non-Patent Document 1).

RELATED ART DOCUMENTS

Patent Documents

[Patent Document 1] Japanese Patent Publication No. 2014-33494

Non-Patent Documents

Non-Patent Document 1 Stefano Stanzione, et al., "A 500 nW Batteryless Integrated Electrostatic Energy Harvester Interface Based on a DC-DC Converter with 60V Maximum Input Voltage and Operating From 1 µW Available Power, Including MPPT and Cold Start", ISSCC 2015, 20.8

SUMMARY

Technical Problem

A high-capacity output-side capacitor requires time roughly proportional to the capacity of the output-side capacitor in order to charge the output-side capacitor and the input-side capacitor at the same time. Therefore, it tends to be difficult to obtain a power supply circuit that exhibits good startup using the configuration described in Non-Patent Document 1.

Therefore, to address the foregoing the present invention proposes a novel configuration whereby a power supply circuit drives a buck converter and exhibits good startup.

Solution to Problem

To address the foregoing, a power supply circuit according to the present invention includes: a primary capacitor configured to temporarily store the energy from an energy harvester; a storage element configured to store the energy for supply to a load; a buck converter configured to charge the storage element with the energy stored in the primary capacitor; a secondary capacitor configured to connect to the primary capacitor to operate in a first state where the voltage between both terminals of the primary capacitor is applied to both terminals of the secondary capacitor and a second state where the voltage between both terminals of the primary capacitor is not applied to both terminals of the secondary capacitor; and a control circuit configured to operate with the secondary capacitor as a power source; the control circuit causes the secondary capacitor to operate in the first state without driving the buck converter when the voltage between both terminals of the primary capacitor is less than a first defined voltage, and causes the secondary capacitor to operate in the second state and drives the buck converter when the voltage between both terminals of the primary capacitor is greater than or equal to the first defined voltage to thereby charge the storage element with the energy stored in the primary capacitor.

That is, a power supply circuit according to the present invention is provided with a secondary capacitor that is separate from the storage element and serves as a power source for the control circuit. The capacity required to operate as a power source for the control circuit may be less than the capacity required to operate as the power source for a load. Therefore, when the secondary capacitor operates in the first state, the voltage from between the terminals of the secondary capacitor increases to the first defined voltage within a short time. When the voltage between the terminals of the secondary capacitor rises to the first defined voltage, the storage element may be efficiently charged with the energy stored in the primary capacitor by using the buck converter. Accordingly, a power supply circuit with good startup can be obtained by adopting the above-described configuration.

Various circuits with different physical configurations may be adopted for the power supply circuit of the present invention. For instance, in a power supply circuit according to the present invention, the secondary capacitor may be connected to the buck converter so that output from the buck converter charges the secondary capacitor; the power supply circuit may further include: the storage element including a first switch configured to enable or disable charging of the storage element with the output from the buck converter, the storage element connected to the buck converter via the first switch; and a second switch configured to enable or disable the connection between the positive terminal of the secondary capacitor and the positive terminal of the primary capacitor; and when the voltage between both terminals of the primary capacitor is less than the first defined voltage, the control circuit controls the second switch so that the secondary capacitor operates in the first state without driving the buck converter and controls the first switch so that the output from the buck converter does not charge the storage element; and when the voltage between both terminals of the primary capacitor is greater than or equal to the first defined voltage, the control circuit controls the second switch so that the secondary capacitor operates in a second state and controls the first switch so that the output from the buck converter charges the storage element.

The voltage between the terminals of the secondary capacitor may become less than the voltage required to operate the control circuit after the secondary capacitor is in the second state in a power supply circuit of the present invention having the above-described configuration. More specifically, the voltage between both terminals of the secondary capacitor eventually become less than the voltage required to operate the control circuit, for instance, if the control circuit continues to consume more energy than the input voltage from the energy harvester for a long time after the secondary capacitor is in the second state. No energy is supplied from the energy harvester to the charging element if the control circuit does not function. Therefore, to ensure it is possible to recharge the secondary capacitor with reduced voltage between both terminals, a power supply circuit of the present invention may further include a reset circuit, the reset circuit discharging the primary capacitor when the voltage between both terminals of the secondary capacitor drops to a defined voltage that is less than the voltage required to operate the control circuit to reduce the voltage between both terminals of the primary capacitor.

Additionally, the control circuit may use the secondary capacitor as a power source, where the voltage between the terminals of the secondary capacitor is always supplied thereto. The control circuit may include at least one circuit that is supplied with energy from the primary capacitor when the voltage between both terminals of the primary capacitor is greater than or equal to the first defined voltage, and whereto no energy is supplied from both terminals of the primary capacitor when the voltage between both terminals of the primary capacitor is less than the first defined voltage.

The details of how the control circuit manages the buck converter is not particularly limited. The control circuit may drive the buck converter in accordance with the voltage between both terminals of the primary capacitor to thereby charge the storage element with the energy stored in the primary capacitor.

The power supply circuit may be implemented as a circuit that supplies direct-current voltage from a direct-current energy harvester to a primary capacitor, or may be further provided with a rectifier configured to convert the alternating current voltage entering from the energy harvester into direct-current voltage, and supplying the direct-current voltage to the primary capacitor.

The power supply circuit may also include a third switch inserted between the storage element and the load and configured to enable or disable the supply of energy to the load; and an output control circuit configured to control the third switch when the output voltage from the storage element is less than or equal to a predetermined voltage to stop the supply of energy to the load.

Effects

The present invention proposes a novel configuration whereby a power supply circuit drives a buck converter and exhibits good startup.

DETAILED DESCRIPTION

Embodiments of the invention are described below on the basis of the drawings. Note that the embodiments described herein are merely examples and the present invention is not limited to the configurations in these embodiments.

Figure 1:
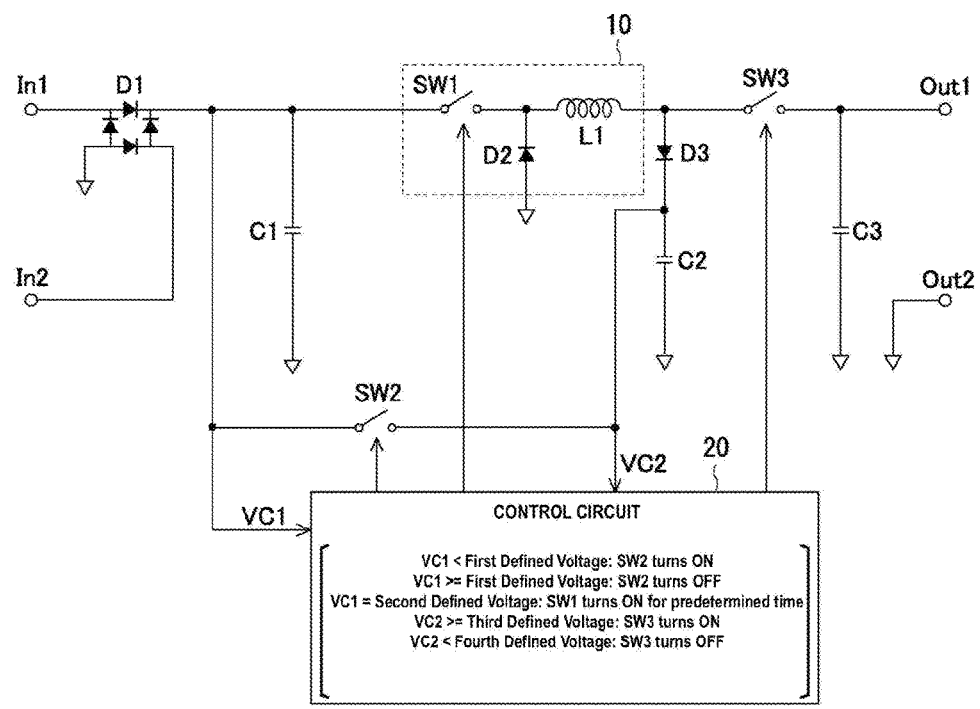
FIG. 1 is a schematic view illustrating a power supply circuit according to a first embodiment of the present invention.

First Embodiment FIG. 1 is a schematic view illustrating a power supply circuit according to a first embodiment of the present invention.

A power supply circuit according to the embodiment is provided with input terminals In1, In2, and output terminals Out1, Out2 as illustrated in FIG. 1. The power supply circuit is also provided with a full-wave rectifier D1, a primary capacitor C1, a buck converter 10, a diode D3, a secondary capacitor C2, a storage element C3, and semiconductor switches SW2, SW3, and a control circuit 20.

The input terminals In1, In2 are for connecting to an alternating current energy harvester. The input terminals In1, In2 are typically connected to a low power (e.g., 100 µW) AC power generator (e.g., an electret-based vibration energy harvester) that outputs alternating current with a relatively large amplitude (e.g., 200 V). The output terminals Out1, Out2 are connected to a load. The output terminals Out1, Out2 are connected to a low-power consuming load, such as a sensor module, that operates at a relatively low voltage (e.g., 2-3 V).

The full-wave rectifier D1 converts the alternating current supplied thereto from the AC-based energy harvester via the input terminals In1, In2 into direct-current; in this embodiment the full-wave rectifier D1 is a diode bridge. The positive output terminal of the full-wave rectifier D1 is connected to one end of the primary capacitor C1 unto the input terminal of the buck converter 10 (i.e., to the semiconductor switch SW1 in the buck converter 10) as illustrated in FIG. 1. The negative output terminal of the full-wave rectifier D1 and the other end of the primary capacitor C1 are both connected to ground.

The primary capacitor C1 has a relatively low capacitance (e.g., 100 nF) and temporarily stores the energy supplied from the AC-based power generator via the full-wave rectifier D1. The primary capacitor C1 may also function to smooth the output from the full-wave rectifier D1. Note that the voltage from the non-grounded terminal of the primary capacitor C1 (i.e., the voltage equivalent to that of the positive output terminal of the full-wave rectifier D1) is labeled VC1 below.

The buck converter 10 transports the energy within the primary capacitor C1 (and in some cases the secondary capacitor C2) to the storage element C3. As illustrated in FIG. 1, the buck converter 10 is configured with one terminal of the inductor L1 and the cathode of the diode D2 connected to the semiconductor switch SW1.

The output end of the buck converter 10 (i.e., the end of the inductor L1 not connected to the semiconductor switch SW1) is connected to one end of the storage element C3 and the output terminal Out1 via the semiconductor switch SW3 (this corresponds to what is termed the "second switch" in the present invention). The other end of the storage element C3 and the output terminal Out2 are connected to ground.

The storage elements C3 accumulates the energy for supply to the load. For example, a capacitor with a capacitance of roughly 100 μF may be used as the storage element C3. Note that a storage element other than a capacitor may be used as the storage element C3, e.g., a lithium ion battery or the like.

The output end of the buck converter 10 may be connected to the cathode of the diode D3 with a secondary capacitor C2 connected between the anode of the diode D3 and ground.

The diode D3 prevents the electrical potential stored in the secondary capacitor C2 from traveling to the storage element C3 when the semiconductor switch SW3 is on.

The secondary capacitor C2 serves as the main power source for the control circuit 20. A capacitor with sufficient capacitance for storing and supplying the control circuit 20 with the required power may serve as the secondary capacitor C2 (e.g., a capacitance of 5 μF).

The junction between the secondary capacitor C2 and the diode D3 may be connected to the positive output terminal of the full-wave rectifier D1 via the semiconductor switch SW2 (which corresponds to what is termed the "second switch" in the present invention). The above-mentioned junction is referred to as the voltage extractor below, and the voltage at the voltage extractor (the inter-terminal voltage of the secondary capacitor C2) is labeled VC2 below.

The control circuit 20 uses VC2 as the source voltage and performs the following controls.
Control 1: turn on semiconductor switch SW2 when VC1 is less than a first defined voltage; Note that Control 1 does not need to turn on the semiconductor switch SW2 at VC1=0.
Control 2: turn off semiconductor switch SW2 when VC1 is greater than or equal to the first defined voltage;
Control 3: turn on the semiconductor switch SW1 for a predetermined time when VC1 rises to a second defined voltage that is greater than the first defined voltage;
Control 4: turn on semiconductor switch SW3 when VC2 is greater than or equal to a third defined voltage; and
Control 5: turn off semiconductor switch SW3 when VC2 is less than a fourth defined voltage.

The fourth defined voltage is greater than or equal to the minimum voltage required for supply by the control circuit 20 to execute Controls 3 through 5. For instance, 2.3 V may be used is the fourth defined voltage. Additionally, the first defined voltage is larger than the fourth defined voltage; and the third defined voltage is greater than or equal to the fourth defined voltage. For example, the first defined voltage may 2.5 V, and the third defined voltage may be 2.5 V or 2.7 V.

The second defined voltage may be established as a value (voltage) near the time average value of the output from the full-wave rectifier D1 with no load divided by two to allow the buck converter 10 to provide efficient transition using the energy stored in the primary capacitor C1.

The operation of a power supply circuit according to this embodiment is described in further detail below; the operation is described separately for when the first defined voltage is less than the third defined voltage and when the first defined voltage is greater than the third defined voltage.

Figure 2A:
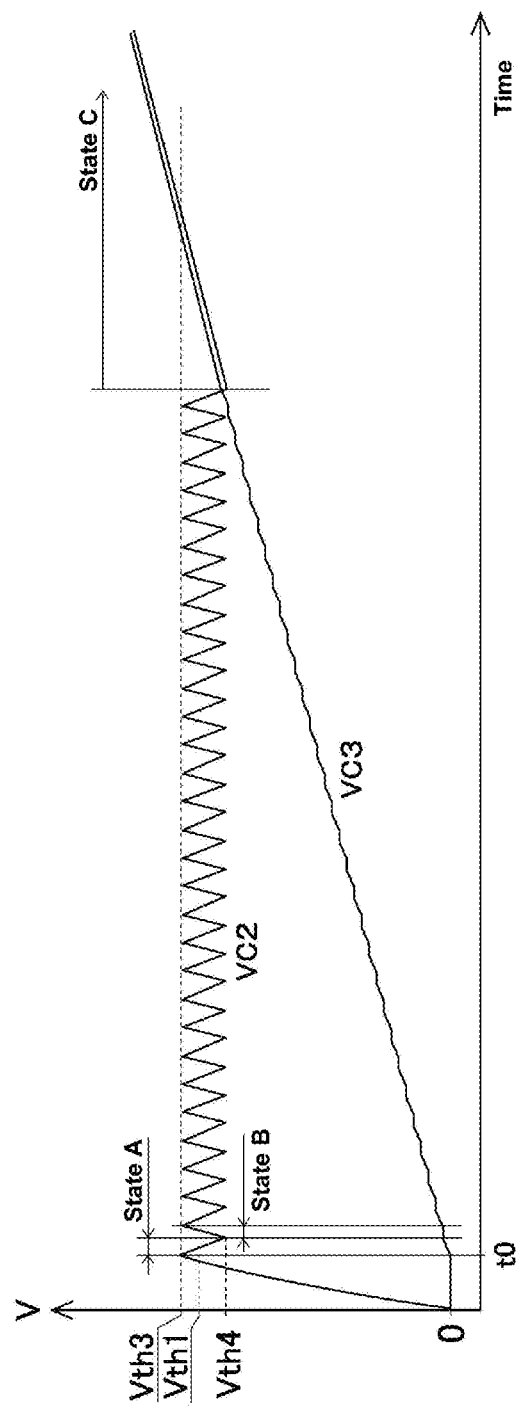
FIG. 2A is a timing chart for describing the operation of the power supply circuit according to the first embodiment when a first defined voltage is less than a third defined voltage.

First, the operation of the power supply circuit is described using FIG. 2A; here the first defined voltage is less than the third defined voltage. FIG. 2A is a timing chart depicting the voltage VC2 of the secondary capacitor C2 and the voltage VC3 of the storage element C3 in the power supply circuit; here, the first defined voltage is less than the second defined voltage, and the AC power generator starts generating power with the capacitors C1, C2, and the storage element C3 at a charge level of zero volt. Note that Vth1, Vth2, and Vth3 in FIG. 2A and FIG. 2B (later described) refer to the first defined voltage, the second defined voltage, and the third defined voltage, respectively.

The voltage VC1 rises with time when the AC power generator starts generating power with the capacitors C1, C2, and the storage element C3 are at a charge level of zero volt; however, the control circuit 20 turns on the switch SW2 when VC1 is less than the first defined voltage. Accordingly, the output from the full-wave rectifier D1 is used to charge the primary capacitor C1 and the secondary capacitor C2 when VC1 is less than the first defined voltage. Note that when the switch SW2 is turned on, VC2 matches VC1. Therefore, in the example described here, where the first defined voltage Vth1 is less than the third defined voltage Vth3, the semiconductor switch SW3 is not turned on while the semiconductor switch SW2 is turned on.

The control circuit 20 turns off the semiconductor switch SW2 once VC1 rises to the first defined voltage. Once the semiconductor switch SW2 is turned off, only the low-capacitance primary capacitor C1 is charged with the output from the full-wave rectifier D1. As a result, VC1 rises immediately to the second defined voltage, and the control circuit 20 drives the buck converter 10 to charge the secondary capacitor C2 with the energy stored in the primary capacitor C1. The voltage VC2 increases at a faster rate when charging the secondary capacitor C2 with the energy stored in the primary capacitor C1 than when the semiconductor switch SW2 is turned on. Accordingly, the initial rising curve of VC2 is inflected at the point that VC1 equals the first defined voltage.

Once the semiconductor switch SW1 is turned on, i.e., once the buck converter 10 is driven, VC1 decreases to less than the second defined voltage. The buck converter 10 is driven once again, since the voltage VC1 increases up to the second defined voltage once the semiconductor switch SW1 turns off due to the decrease in VC1.

This control is repeatedly executed, and the control circuit 20 turns on the semiconductor switch SW3 once VC2 rises to the third defined voltage Vth3.

As is clear from the configuration of the power supply circuit, the storage element C3 does not charge if the semiconductor switch SW3 is not turned on. Therefore, when the first defined voltage Vth1 is less than the third defined voltage Vth3, VC3 remains at 0V and only VC2 rises until time t0 when VC2 arrives at the third defined voltage Vth3 as schematically depicted in FIG. 2A.

The output end of the buck converter 10 is connected to the secondary capacitor C2 and the storage element C3 once VC2 rises to the third defined voltage Vth3 and the semiconductor switch SW3 is turned on. Given that control is already initiated to drive the buck converter 10 each time VC1 rises to the second defined voltage, this creates State A where the storage element C3 is charged with the energy stored in the primary capacitor C1 (and power from the full-wave rectifier D1) when VC2 rises to the third defined voltage Vth3. In State A, the secondary capacitor C2 is not charged since VC2 is greater than VC3.

Figure 2B:
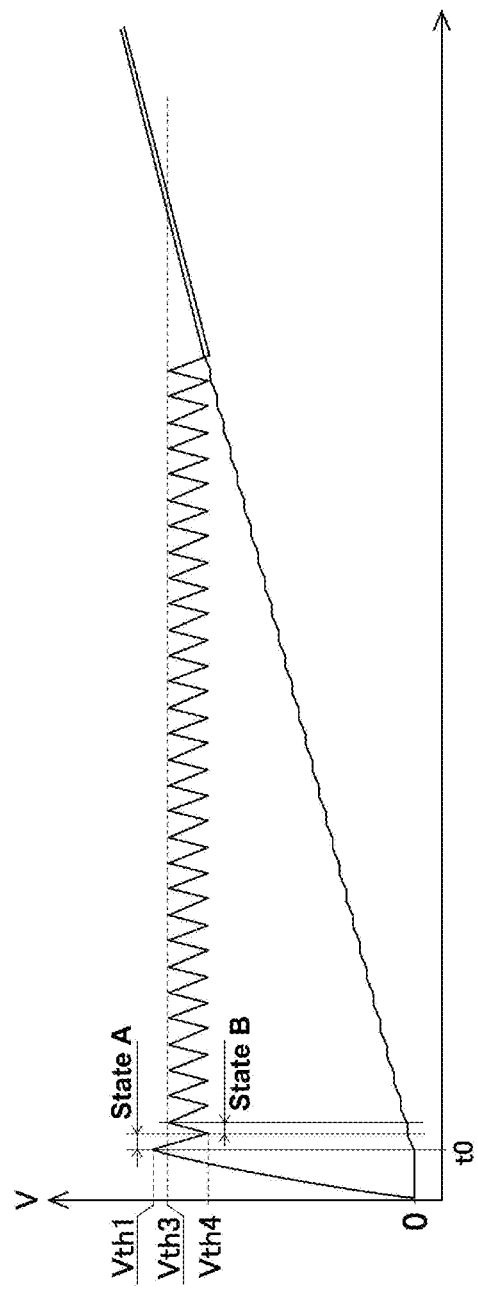
FIG. 2B is a timing chart for describing the operation of the power supply circuit according to the first embodiment when the third defined voltage is less than the first defined voltage.

In State A, the semiconductor switches SW1, SW2 are controlled using the energy in the secondary capacitor C2; therefore, in State A, VC3 increases with time while VC2 decreases as depicted in FIG. 2A and FIG. 2B.

In State A, the control circuit 20 turns off the semiconductor switch SW3 once VC2 falls to the fourth defined voltage Vth4. In other words, the control circuit 20 disconnects the storage element C3 from the output end of the buck converter 10 and charges the secondary capacitor C2 with the output from the buck converter 10, thus creating State B. The voltage VC3 does not change in State B because the semiconductor switch SW3 is turned off. The voltage VC2 rises faster than when the semiconductor switch SW1 is turned off.

The control circuit 20 subsequently drives the buck converter 10 each time VC1 rises to the second defined voltage. The control circuit 20 returns the power supply circuit to State A by turning on the semiconductor switch SW3 once VC2 rises to the third defined voltage Vth3.

The voltage VC3 matches the voltage VC2 after repeating this control. Once VC3 matches VC2, the output voltage of the buck converter 10 is applied to both the secondary capacitor C2 and the storage element C3. Therefore, the secondary capacitor C2 and the storage element C3 are charged with the output from the buck converter 10, creating State C.

Next, the operation of the power supply circuit is described; here, the first defined voltage is greater than the third defined voltage. FIG. 2B is a timing chart depicting the voltage VC2 of the secondary capacitor C2 and the voltage VC3 of the storage element C3 in the power supply circuit; here, the third defined voltage is less than the first defined voltage, and the AC power generator starts generating power with the capacitors C1, C2, and the storage element C3 at a charge level of zero volt.

The AC power generator may start generating power with the capacitors C1, C2, and the storage element C3 at a charge level of zero volt. In this case, the semiconductor switch SW2 is turned on and the primary capacitor C1 and the secondary capacitor C2 are charged with the output from the full-wave rectifier D1 until VC1 reaches the first defined voltage, even in the power supply circuit where the third defined voltage is less than the first defined voltage.

The voltage VC2 reaches or exceeds the third defined voltage before the semiconductor switch SW2 is turned off in a power supply circuit where the third defined voltage is less than the first defined voltage. Therefore, although the semiconductor switch SW3 is turned on before the semiconductor switch SW2 is turned off, the control for driving the buck converter 10 is not initiated at this stage. Consequently, the storage element C3 does not charge when the semiconductor switch SW2 is turned on even with the semiconductor switch SW3 turned on.

Once VC1 reaches the first defined voltage and the semiconductor switch SW2 is turned off, only the low-capacitance primary capacitor C1 is charged with the output from the full-wave rectifier D1. Therefore, VC1 rises immediately to the second defined voltage, and the control circuit 20 drives the buck converter 10. At this point, since the semiconductor switch SW3 is already turned on, the power supply circuit enters State A where the energy stored in the primary capacitor C1 is used to charge the storage element C3 and the energy in the secondary capacitor C2 is used to execute each type of control.

In State A, the control circuit 20 turns off the semiconductor switch SW3 once VC2 falls to the fourth defined voltage Vth4. That is, the control circuit 20 uses the output from the buck converter 10 to quickly charge the secondary capacitor C2, thus creating State B. The control circuit 20 also drives the buck converter 10 each time VC1 rises to the second defined voltage; State A is once again created when VC2 rises to the third defined voltage Vth3 and the control circuit 20 turns on the semiconductor switch SW3.

The voltage VC3 eventually matches the voltage VC2 from repeating the above mentioned controls, and the secondary capacitor C2 and the storage element C3 are charged with the output from the buck converter 10, creating State C.

As above described, a power supply circuit according to the embodiment is provided with a secondary capacitor C2 that is separate from the storage element C3 and serves as a power source for the control circuit 20. The capacity required to operate as a power source for the control circuit 20 may be less than the capacity required to operate as the power source for a load. Therefore, VC2 rises up to the first defined voltage in a short time when the secondary capacitor C2 and the primary capacitor C1 are charged simultaneously with power from the full-wave rectifier D1. It is thus possible to obtain a power supply circuit with good startup on adopting the above-mentioned configuration, given that the power supply circuit may start charging the storage element C3 with the energy from the primary capacitor C1 once the secondary capacitor C2 is charged (i.e., once VC2 has risen to the first defined voltage).

A concrete example of configuring in a power supply circuit according to the first embodiment is described below. In the description that follows, a p-channel MOS field effect transistor PMOSx (where, x is a natural number) is referred to simply as a PMOSx. Similarly, an n-channel MOS field effect transistor NMOSx is referred to as an NMOSx.

Circuit Configuration: Example 1

Figure 3:
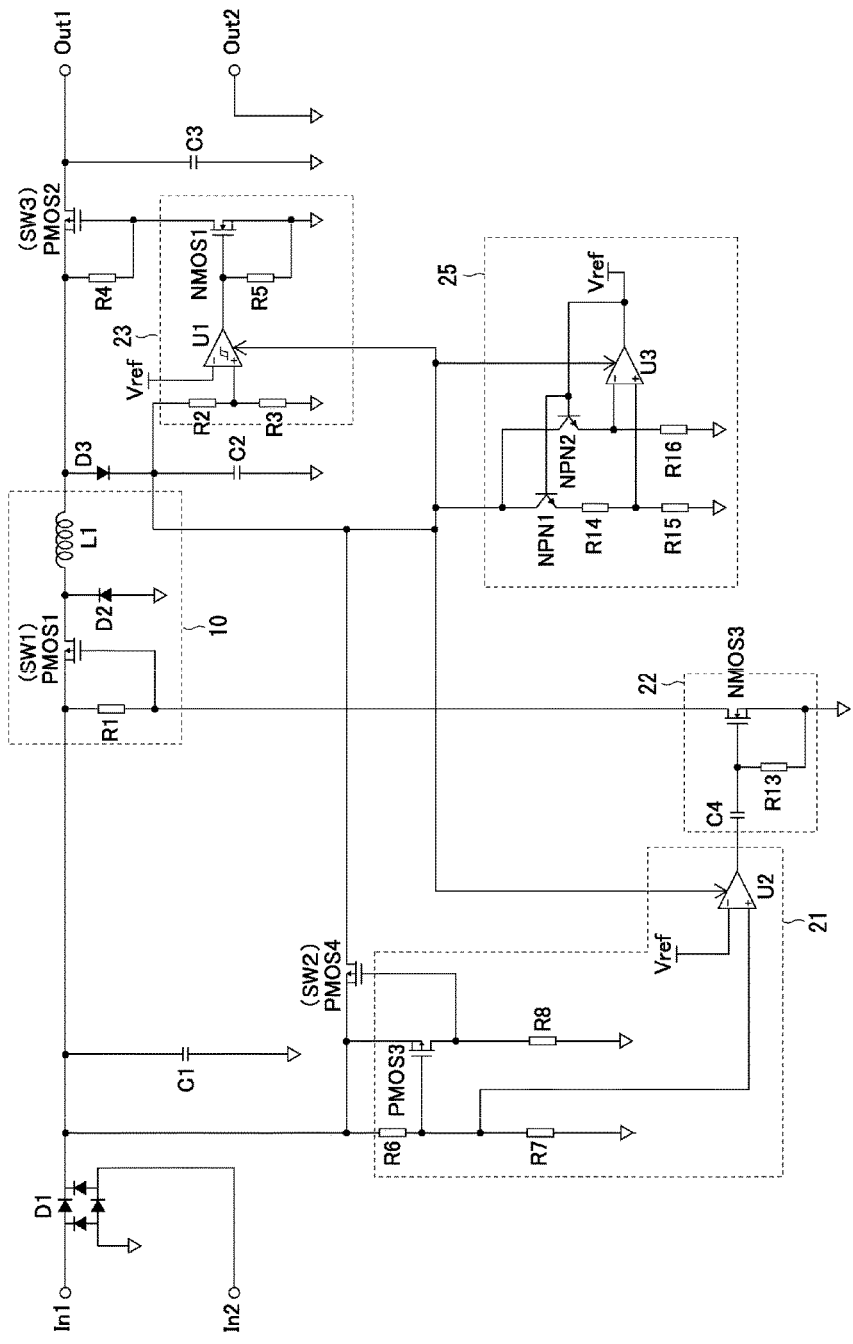
FIG. 3 is for describing an example circuit configuration for the power supply circuit according to the first embodiment.

A power supply circuit according to the first embodiment may be implemented as a circuit configured as illustrated in FIG. 3.

The power supply circuit may use PMOS1, PMOS2, and PMOS4 to serve as the semiconductor switches SW1, SW2, SW3; additionally, a first connection control circuit 21, a driver circuit 22, a second connection control circuit 23, and a fixed voltage circuit 25 may serve as the control circuit 20. The PMOS used to serve as the semiconductor switches SW1-SW3 may be arranged with the source as the input side as depicted in FIG. 3. A resistor R1 is placed between the source and gate of the PMOS1, and a resistor R4 is placed between the source and gate of the PMOS2.

The first connection control circuit 21, the driver circuit 22, the second connection control circuit 23, and the fixed voltage circuit 25 are described below.

The fixed voltage circuit 25 is made up of two NPN transistors NPN1, NPN2, a comparator U3, and resistors R1-R16. The fixed voltage circuit 25 uses VC2 as the source voltage. The fixed voltage circuit 25 outputs a constant voltage (e.g., 1V); this constant voltage is used as a reference voltage Vref by a comparator U2 and a comparator U1 within the first connection control circuit 21 and the second connection control circuit 23 respectively.

The first connection control circuit 21 performs the following functions:
  turns on PMOS4 when VC1 is less than the first defined voltage; turns off PMOS4 when VC1 is greater than or equal to the first defined voltage; and
  supplies a high-level control signal to the driver circuit 22 when VC1 is greater than or equal to the second defined voltage.

More specifically, the first connection control circuit 21 is made up of the PMOS3, resistors R6-R8, and the comparator U2. The source and drain of the PMOS3 are connected to the source and gate of the PMOS4, respectively. The resistor R6 is provided between the source and gate of the PMOS3, and the resistor R7 is provided between the gate of the PMOS3 and ground.

The resistor R8 is provided between the drain of the PMOS3 (i.e., the gate of the PMOS4) and ground. The voltage from the reference voltage Vref and from the junction of resistors R6, R7 (referred to as the U2-bound voltage below) enter the negative and positive input terminals of the comparator U2, respectively. The output from the comparator U2 is supplied to the driver circuit 22 as a control signal. The resistance values of the resistors R6, R7 are defined to satisfy the following conditions:
  PMOS3 switches on when VC1 is the first defined voltage; and
  the reference Vref equals the U2-bound voltage when VC1 equals the second defined voltage.

Therefore, the first connection control circuit 21 turns on PMOS4 when VC1 is less than the first defined voltage; and turns off PMOS4 when VC1 is greater than or equal to the first defined voltage. The first connection control circuit 21 also supplies a high-level control signal to the driver circuit 22 when VC1 is greater than or equal to the second defined voltage.

The driver circuit 22 is made up of an NMOS3, a capacitor C4, and a resistor R13. The capacitor C4 is connected between the output terminal of the comparator U2 and the gate of the NMOS3; the resistor R13 is connected between the gate and source of the NMOS3. The source and drain of the NMOS3 in the driver circuit 22 are connected to ground, and to the gate of the PMOS1 in the buck converter 10, respectively.

Therefore, the NMOS3 in the driver circuit 22 is turned on for a fixed time (i.e., a time defined by the capacitance of the capacitor C4, and the resistance value of the resistor R13) after the U2-bound voltage equals the reference voltage Vref. When the NMOS3 is turned on, the PMOS1 is also turned on since there is a resistor R1 between the source and gate of the PMOS1. Accordingly, the driver circuit 22 and the first connection control circuit 21 turns on the semiconductor switch SW1 (i.e., PMOS1) for a predetermined time once VC1 rises to the second defined voltage.

The second connection control circuit 23 turns on the PMOS2 when VC2 exceeds the third defined voltage; and turns off the PMOS2 when VC2 is less than the fourth defined voltage.

More specifically, the second connection control circuit 23 is configured from a voltage divider circuit configured from the resistor R2 and resistor R3 connected in series, a PMOS2, an NMOS1, and a comparator U1, with a resistor R5 connected between the gate and source of the NMOS1.

The comparator U1 used in the second connection control circuit 23 is a hysteresis comparator. That is, the comparator U1 transitions to a state where the comparator U1 outputs a high signal when the input voltage to the positive input terminal (below, positive terminal voltage) is greater than the input voltage to the negative input terminal (below, negative terminal voltage). The comparator U1 transitions to a state where the comparator U1 outputs a low signal when the positive terminal voltage is less than or equal to the negative terminal voltage multiplied by k1 (where k1 is a proportionality constant less than 1).

The reference voltage Vref enters the negative input terminal of the comparator U1 from the fixed voltage circuit 25; and the output voltage from the voltage divider circuit, i.e., the voltage at the junction of the resistor R2 and the resistor R3, enters the positive input terminal of the comparator U1. The output terminal of the comparator U1 is connected to the gate of the NMOS1; the source and drain of the NMOS1 are connected to ground and to the gate of the PMOS2, respectively.

The input end of the voltage divider circuit near the resistor R2 is connected to the voltage extractor, and the other end is connected to ground. The voltage extractor is the junction between the diode D3 and the secondary capacitor C2 where the voltage is VC2 as previously defined.

The resistance value of the resistor R2 and the resistor R3 is established so that the output voltage from the voltage divider circuit matches the reference voltage Vref when VC2 equals the third defined voltage. The second connection control circuit 23 also uses a configuration where k1 equals the reference voltage divided by a third defined voltage as the comparator U1.

Therefore, the second connection control circuit 23 turns on the PMOS2 when VC2 exceeds the third defined voltage; and turns off the PMOS2 when VC2 is less than the fourth defined voltage.

Circuit Configuration: Example 2

Figure 4:
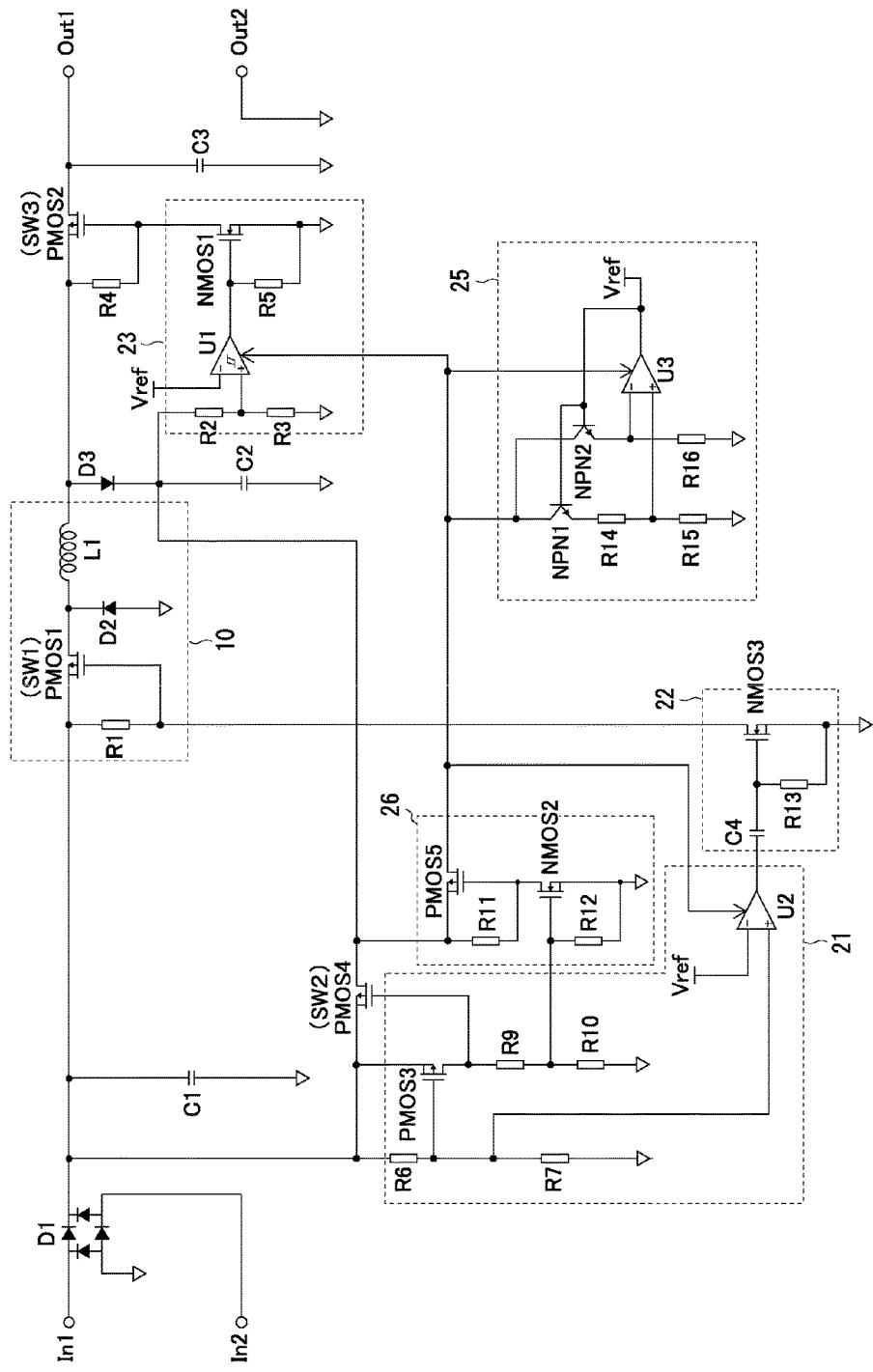
FIG. 4 is for describing another example circuit configuration for the power supply circuit according to the first embodiment.

A power supply circuit according to the first embodiment may be implemented as a circuit configured as illustrated in FIG. 4.

The power supply circuit is based on modifying the power supply circuit depicted in FIG. 3; more specifically, the power supply circuit (FIG. 3) supplies VC1 to the first connection control circuit 21, the second connection control circuit 23, and the fixed voltage circuit 25 only if VC1 is greater than or equal to a fifth defined voltage which is greater than or equal to the first defined voltage and less than or equal to the second defined voltage; e.g., 20 V.

That is, VC2 is always supplied to the first connection control circuit 21, the second connection control circuit 23, and the fixed voltage circuit 25 in the circuit configuration depicted in FIG. 3. Because the energy in the secondary capacitor C2 is consumed when VC2 is supplied to the circuits 21, 23, and 25, this creates a need to charge the secondary capacitor C2, not the storage element C3. Therefore, preferably supplying VC2 to the circuits 21, 23, and stops during the times supplying VC2 is unnecessary.

The power supply circuit can function without problems even if the circuits 21, 23, and are supplied with VC2 only when VC1 is greater than or equal to the fifth defined voltage, e.g., 20 V; in other words, VC2 is not supplied to the circuits 21, 23, and 25 when VC1 is less than the fifth defined voltage.

Therefore, the configuration depicted in FIG. 4 may be adopted for the power supply circuit. That is, the power supply circuit may use a first connection control circuit 21 with a voltage divider circuit where a resistor R9 and a resistor R10 are connected in series, instead of having the resistor R8 (FIG. 3).

A third connection control circuit 26 may also be added to the power supply circuit. The third connection control circuit 26 is configured to enable and disable supply of VC1 to the first connection control circuit 21, the second connection control circuit 23, and the fixed voltage circuit 25. The third connection control circuit 26 is configured from a PMOSS; an NMOS2, with the drain connected to the gate of the PMOSS; a resistor R11 placed between the source and gate of the PMOSS, and a resistor R12 arranged between the source and the gate of the NMOS2. The third connection control circuit 26 is connected to each circuit so that the first connection control circuit 21, the second connection control circuit 23, and the fixed voltage circuit 25 are supplied VC1 via through the PMOSS. An output voltage from the voltage divider circuit in the first connection control circuit 21 enters the gate of the NMOS2 in the third connection control circuit 26. The resistance value of the resistor R9 and the resistor R10 are defined such that the output voltage of the voltage divider circuit enables the NMOS2 when VC1 is the fifth defined voltage (e.g., 20 V).

The third connection control circuit 26 is configured so that enabling and disabling the NMOS2 thus enables and disables the PMOSS. Therefore, the power supply circuit supplies the first connection control circuit 21, the second connection control circuit 23, and the fixed voltage circuit 25 with VC1 only when VC1 is greater than or equal to the fifth defined voltage (e.g., 20 V). As a result, the power supply circuit is more capable of efficiently storing energy from the alternating current power source in the storage element C3 compared to the power supply circuit depicted in FIG. 3.

Second Embodiment

The configuration and operation of a power supply circuit according to a second embodiment is described below, where mainly the differences with the power supply circuit of the above first embodiment is described.

Figure 5:
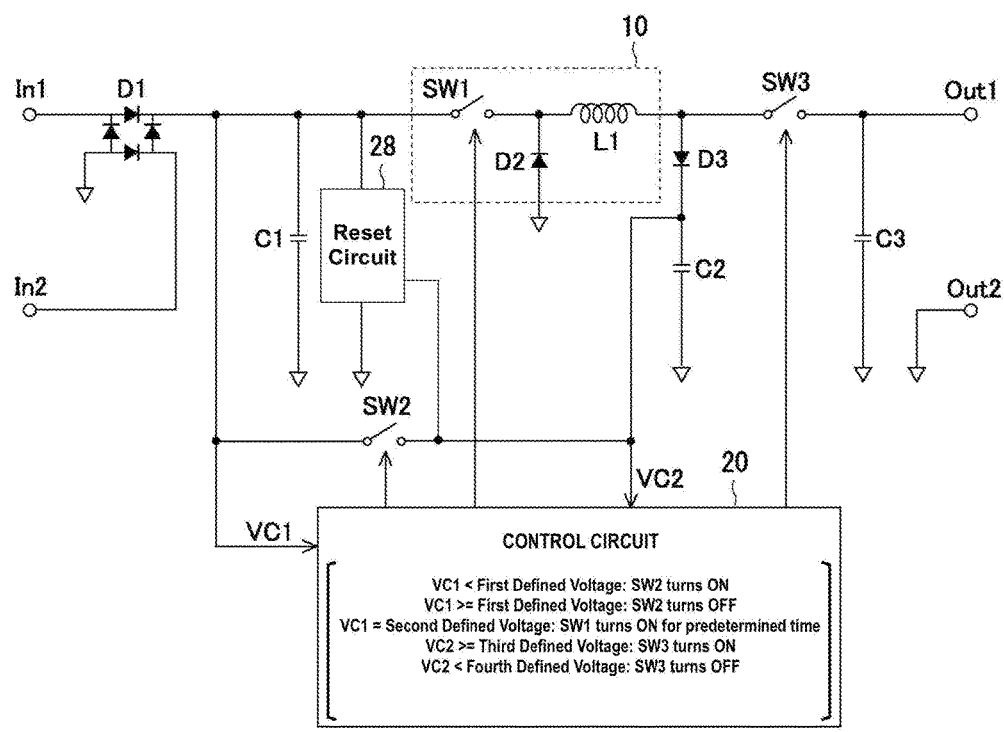
FIG. 5 is a schematic view illustrating a power supply circuit according to a second embodiment of the present invention.

FIG. 5 is a schematic view illustrating a power supply circuit according the embodiment.

As is clear on comparing FIG. 5 and FIG. 1, the power supply circuit according to the embodiment adds a reset circuit 28 to the power supply circuit according to the first embodiment.

The reset circuit 28 causes the primary capacitor C1 to discharge and reduce VC1 to less than the first defined voltage (e.g., 0 V, in this embodiment) when VC2 drops to less than or equal to the minimum voltage required to operate the control circuit 20.

In other words, the power supply circuit according to the first embodiment does not usually end up in a state where VC2 is less than or equal to the minimum voltage required to operate the control circuit 20. However, the voltage VC2 may conceivably become less than the minimum voltage required to operate the control circuit 20. More specifically, the voltage VC2 eventually becomes less than the voltage required to operate the control circuit 20, for instance, if the control circuit continues to consume more energy than the input voltage from the energy harvester for a long time after VC2 is equal to or greater than the first defined voltage (after the semiconductor switch SW2 is turned off). If the control circuit 20 is not operating, the power supply circuit of the first embodiment does not operate to charge the storage element C3 with the energy from the alternating current power source.

Whereas, in the power supply circuit of this embodiment, which is provided with the reset circuit 28, the reset circuit 28 activates when VC2 drops to less than or equal to the minimum voltage required to operate the control circuit 20, and VC1 decreases to less than the first defined voltage. The control circuit 20 turns on the semiconductor switch SW3 when VC1 is less than the first defined voltage. Therefore, the storage element C3 starts charging again immediately in the power supply circuit according to this embodiment even if VC2 drops to less than or equal to the minimum voltage required to operate the control circuit 20 and the storage element C3 stops charging.

Figure 6:
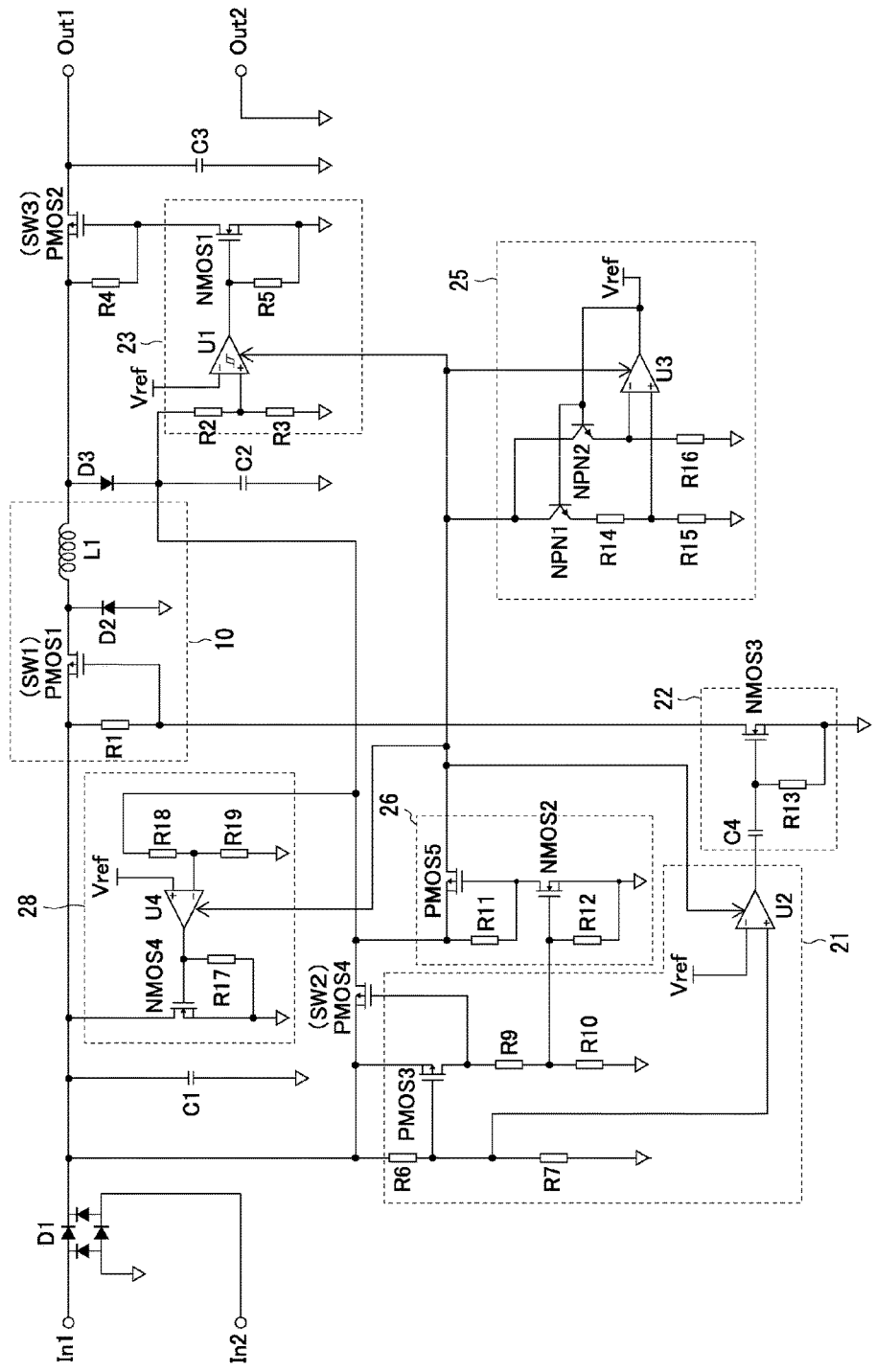
FIG. 6 is for describing an example circuit configuration for the power supply circuit according to the second embodiment.

Various circuits with different physical configurations may be adopted as the reset circuit 28. For instance, the reset circuit 28 may be a combination of an NMOS4, a comparator U4, and resistors R17-R19 as illustrated in FIG. 6. In the reset circuit 28, a voltage divider circuit wherein the resistors R18 and R19 are in series outputs the same voltage as the reference voltage when VC2 matches a predetermined voltage that is less than or equal to the minimum voltage required to operate the control circuit 20.

Possible Modifications

Figure 7:
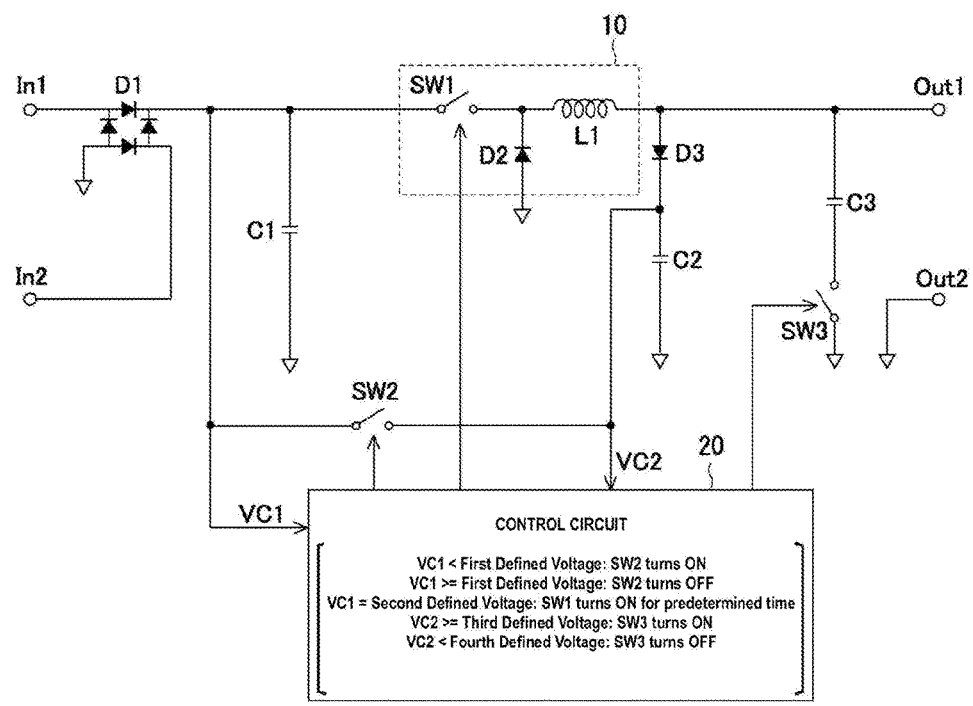
FIG. 7 is for describing examples of modifying the power supply circuit according to the embodiments.

A power supply circuit according to the above-mentioned embodiments may be modified in various ways. For example, the power supply circuit according to the first embodiment may be modified so that the semiconductor switch SW3 is provided between the ground circuit and the storage element C3 as illustrated in FIG. 7. The power supply circuit according to the second embodiment may be modified so that the semiconductor switch SW3 is provided at the ground of the storage element C3.

Figure 8:
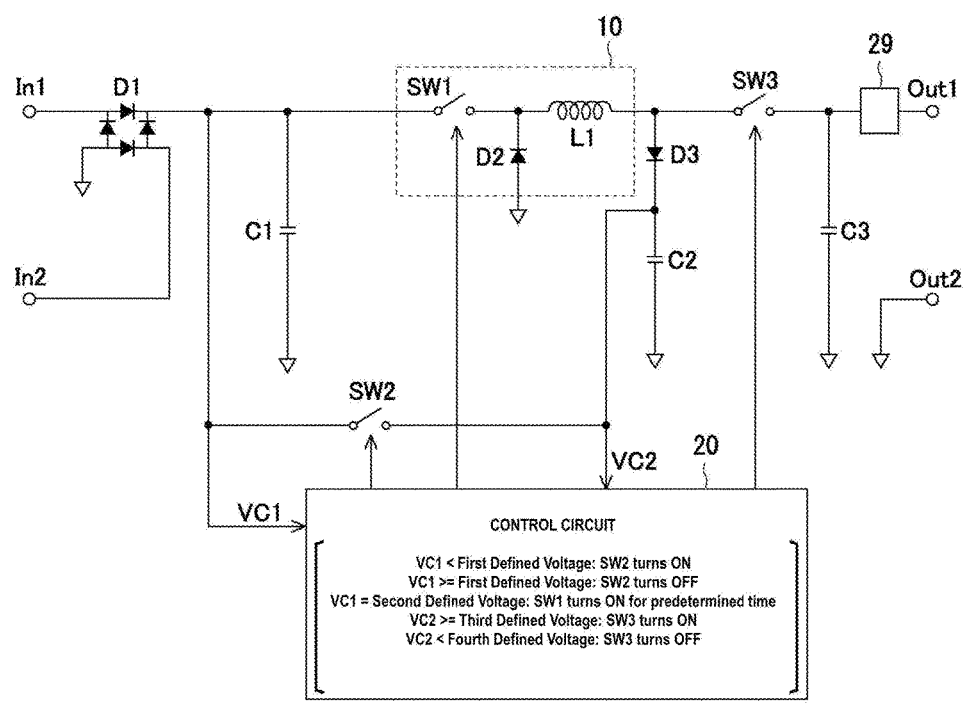
FIG. 8 is for describing examples of modifying the power supply circuit according to the embodiment.

An output control circuit 29 may be added between the output terminal Out1 and the storage element C3 in the power supply circuit according to the first embodiment as illustrated in FIG. 8. The output control circuit 29 prohibits external output of VC3 when VC3 is less than or equal to a predetermined voltage (around 3 V). The output control circuit 29 may also be used to determine whether or not to output the voltage VC3 from the output terminals Out1, Out2 on the basis of a signal from the load when the load can be configured to output a signal that indicates whether or not power needs to be supplied. A power supply circuit according to the second embodiment may be similarly modified.

REFERENCE NUMERALS

10 Buck converter
20 Control Circuit
21 First connection control circuit
22 Driver circuit
23 Second connection control circuit
25 Fixed voltage circuit
28 Reset Circuit
29 Output control circuit

The invention claimed is:
1. A power supply circuit comprising:
a primary capacitor configured to temporarily store energy from an energy harvester;
a storage element comprising at least one of a capacitor and a battery, the storage element storing the energy for supplying to a load;
a buck converter configured to charge the storage element with the energy stored in the primary capacitor;

a secondary capacitor configured to connect to the primary capacitor to operate in a first state where voltage between both terminals of the primary capacitor is applied to both terminals of the secondary capacitor and to operate in a second state where the voltage between both of the terminals of the primary capacitor is not applied to both of the terminals of the secondary capacitor; and a control circuit configured to operate with the secondary capacitor as a power source, wherein the control circuit causes the secondary capacitor to operate in the first state without driving the buck converter in response to the voltage between both of the terminals of the primary capacitor being less than a first defined voltage, and causes the secondary capacitor to operate in the second state and drives the buck converter in response to the voltage between both of the terminals of the primary capacitor being greater than or equal to the first defined voltage to charge the storage element with the energy stored in the primary capacitor.

2. The power supply circuit according to claim 1, wherein the secondary capacitor is connected to the buck converter so that output from the buck converter charges the secondary capacitor; the power supply circuit further comprising:

the storage element further comprising: a first switch configured to enable or disable charging of the storage element with the output from the buck converter, the storage element connected to the buck converter via the first switch; and a second switch configured to enable or disable a connection between a positive terminal of the secondary capacitor and a positive terminal of the primary capacitor; and in response to the voltage between both of the terminals of the primary capacitor being less than the first defined voltage, the control circuit controls the second switch so that the secondary capacitor operates in the first state without driving the buck converter and controls the first switch so that the output from the buck converter does not charge the storage element; and in response to the voltage between both of the terminals of the primary capacitor being greater than or equal to the first defined voltage, the control circuit controls the second switch so that the secondary capacitor operates in the second state and controls the first switch so that the output from the buck converter charges the storage element.

3. The power supply circuit according to claim 2, further comprising: a reset circuit, the reset circuit discharging the primary capacitor in response to the voltage between both of the terminals of the secondary capacitor dropping to a defined voltage that is less than the voltage required to operate the control circuit to reduce the voltage between both of the terminals of the primary capacitor.

4. The power supply circuit according to claim 2, wherein the control circuit comprises at least one circuit that is supplied with energy from the primary capacitor in response to the voltage between both of the terminals of the primary capacitor being greater than or equal to the first defined voltage, and that is not supplied with energy from both of the terminals of the primary capacitor in response to the voltage between both of the terminals of the primary capacitor being less than the first defined voltage.

5. The power supply circuit according to claim 2, wherein the control circuit drives the buck converter in accordance with the voltage between both of the terminals of the primary capacitor to charge the storage element with the energy stored in the primary capacitor.

6. The power supply circuit according to claim 2, further comprising: a rectifier configured to convert an alternating current voltage entering from the energy harvester into direct-current voltage, and supplying the direct-current voltage to the primary capacitor.

7. The power supply circuit according to claim 2, further comprising: a third switch inserted between the storage element and the load and configured to enable or disable a supply of energy to the load; and an output control circuit configured to control the third switch in response to an output voltage from the storage element being less than or equal to a predetermined voltage to stop the supply of energy to the load.

8. The power supply circuit according to claim 1, further comprising: a reset circuit, the reset circuit discharging the primary capacitor in response to the voltage between both of the terminals of the secondary capacitor dropping to a defined voltage that is less than the voltage required to operate the control circuit to reduce the voltage between both of the terminals of the primary capacitor.

9. The power supply circuit according to claim 8, wherein the control circuit comprises at least one circuit that is supplied with energy from the primary capacitor in response to the voltage between both of the terminals of the primary capacitor being greater than or equal to the first defined voltage, and that is not supplied with energy from both of the terminals of the primary capacitor in response to the voltage between both of the terminals of the primary capacitor being less than the first defined voltage.

10. The power supply circuit according to claim 8, wherein the control circuit drives the buck converter in accordance with the voltage between both of the terminals of the primary capacitor to charge the storage element with the energy stored in the primary capacitor.

11. The power supply circuit according to claim 8, further comprising: a rectifier configured to convert an alternating current voltage entering from the energy harvester into direct-current voltage, and supplying the direct-current voltage to the primary capacitor.

12. The power supply circuit according to claim 8, further comprising: a third switch inserted between the storage element and the load and configured to enable or disable a supply of energy to the load; and an output control circuit configured to control the third switch in response to an output voltage from the storage element being less than or equal to a predetermined voltage to stop the supply of energy to the load.

13. The power supply circuit according to claim 1, wherein the control circuit comprises at least one circuit that is supplied with energy from the primary capacitor in response to the voltage between both of the terminals of the primary capacitor being greater than or equal to the first defined voltage, and that is not supplied with energy from both of the terminals of the primary capacitor in response to the voltage between both of the terminals of the primary capacitor being less than the first defined voltage.

14. The power supply circuit according to claim 13, wherein the control circuit drives the buck converter in accordance with the voltage between both of the terminals of the primary capacitor to charge the storage element with the energy stored in the primary capacitor.

15. The power supply circuit according to claim 13, further comprising: a rectifier configured to convert an alternating current voltage entering from the energy harvester into direct-current voltage, and supplying the direct-current voltage to the primary capacitor.

16. The power supply circuit according to claim 13, further comprising: a third switch inserted between the storage element and the load and configured to enable or disable a supply of energy to the load; and
    an output control circuit configured to control the third switch in response to an output voltage from the storage element being less than or equal to a predetermined voltage to stop the supply of energy to the load.

17. The power supply circuit according to claim 1, wherein the control circuit drives the buck converter in accordance with the voltage between both of the terminals of the primary capacitor to charge the storage element with the energy stored in the primary capacitor.

18. The power supply circuit according to claim 1, further comprising: a rectifier configured to convert an alternating current voltage entering from the energy harvester into direct-current voltage, and supplying the direct-current voltage to the primary capacitor.

19. The power supply circuit according to claim 1, further comprising: a third switch inserted between the storage element and the load and configured to enable or disable a supply of energy to the load; and
    an output control circuit configured to control the third switch in response to an output voltage from the storage element being less than or equal to a predetermined voltage to stop the supply of energy to the load.

\* \* \* \* \*